US011948118B1

(12) United States Patent
Subramaniam et al.

(10) Patent No.: US 11,948,118 B1
(45) Date of Patent: Apr. 2, 2024

(54) CODEBASE INSIGHT GENERATION AND COMMIT ATTRIBUTION, ANALYSIS, AND VISUALIZATION TECHNOLOGY

(71) Applicant: DevFactory Innovations FZ-LLC, Dubai Media (AE)

(72) Inventors: Rahul Subramaniam, Dubai (AE); Vivek Ratan, Bangalore (IN); Pranav Ram, Bangalore (IN)

(73) Assignee: DevFactory Innovations FZ-LLC, Dubai Media (AE)

( * ) Notice: Subject to any disclaimer, the term of this patent is extended or adjusted under 35 U.S.C. 154(b) by 0 days.

(21) Appl. No.: 17/071,798

(22) Filed: Oct. 15, 2020

Related U.S. Application Data

(60) Provisional application No. 62/915,630, filed on Oct. 15, 2019.

(51) Int. Cl.
  *G06Q 10/0639* (2023.01)
  *G06F 8/71* (2018.01)
  *G06F 8/73* (2018.01)

(52) U.S. Cl.
  CPC ......... *G06Q 10/06398* (2013.01); *G06F 8/71* (2013.01); *G06F 8/73* (2013.01); *G06Q 10/06395* (2013.01)

(58) Field of Classification Search
  None
  See application file for complete search history.

(56) References Cited

U.S. PATENT DOCUMENTS

| 7,174,536 | B1 | 2/2007 | Kothari et al. | |
|---|---|---|---|---|
| 8,479,169 | B1 * | 7/2013 | Evans | G06F 11/3604 717/131 |
| 8,635,204 | B1 | 1/2014 | Xie et al. | |
| 8,776,026 | B2 * | 7/2014 | Candea | G06F 11/3664 717/126 |

(Continued)

FOREIGN PATENT DOCUMENTS

| CN | 111177731 A | * | 5/2020 | |
|---|---|---|---|---|
| WO | WO-2010107671 A2 | * | 9/2010 | ......... G06F 11/3676 |
| WO | WO-2017181286 A1 | * | 10/2017 | ......... G06F 11/3466 |

OTHER PUBLICATIONS

Dalla Palma, Stefano, et al. "Toward a catalog of software quality metrics for infrastructure code." Journal of Systems and Software 170 (2020): 110726. (Year: 2020).*

(Continued)

*Primary Examiner* — Thomas L Mansfield

(57) ABSTRACT

A method and system include code analysis and visualization technology. The method and system include (i) a repository that stores developer code in a codebase to which many developers and developer teams contribute code over time, (ii) one or more static analysis tools that identify misbehaviors in the codebase from a list of predetermined misbehaviors, (iii) a database that includes each commit that each developer performed on the codebase for a predetermined period of time, (iv) a code attribution tool that employs abstract syntax trees to determine if each commit that a particular developer performs resulted in breaking the code or impairing the code, or results in a failure to correct the code, or if clean code results, and (v) a dashboard tool that enables visualization at different levels of commits with misbehaviors over a predetermined period of time.

4 Claims, 24 Drawing Sheets

(56) References Cited

U.S. PATENT DOCUMENTS

| | | |
|---|---|---|
| 8,881,122 B1 | 11/2014 | Klimek et al. |
| 9,235,494 B2 | 1/2016 | Gautam |
| 10,560,539 B1* | 2/2020 | Loch ................... H04L 67/2819 |
| 10,628,584 B1* | 4/2020 | Norton ................... G06F 21/563 |
| 2014/0282411 A1* | 9/2014 | Liemandt ............ G06F 11/3672 717/124 |
| 2015/0081739 A1 | 3/2015 | Xu |
| 2015/0302300 A1 | 10/2015 | Fletcher et al. |
| 2015/0339217 A1* | 11/2015 | Avgerinos ........... G06F 11/3688 717/131 |
| 2016/0062748 A1 | 3/2016 | van Gogh et al. |
| 2016/0092527 A1 | 3/2016 | Kang et al. |
| 2016/0275116 A1 | 9/2016 | Shi et al. |
| 2017/0060958 A1 | 3/2017 | Van Rest et al. |
| 2018/0017372 A1 | 1/2018 | Tor et al. |
| 2018/0018402 A1 | 1/2018 | Vogler et al. |
| 2018/0143826 A1 | 5/2018 | Crabtree et al. |
| 2018/0329953 A1 | 11/2018 | Weld et al. |
| 2018/0364992 A1 | 11/2018 | Weld et al. |
| 2018/0373507 A1 | 12/2018 | Mizrahi et al. |
| 2019/0052602 A1 | 2/2019 | Abraham et al. |
| 2019/0138731 A1* | 5/2019 | Tan .......................... G06N 7/01 |
| 2021/0056211 A1* | 2/2021 | Olson ...................... G06N 3/08 |

OTHER PUBLICATIONS

Destefanis, Giuseppe, et al. "Smart contracts vulnerabilities: a call for blockchain software engineering?." 2018 International Workshop on Blockchain Oriented Software Engineering (IWBOSE). IEEE, 2018. (Year: 2018).*

Scholte, Theodoor, et al. "Preventing input validation vulnerabilities in web applications through automated type analysis." 2012 IEEE 36th annual computer software and applications conference. IEEE, 2012. (Year: 2012).*

Francesca Arcelli Fontana, et al., Towards a Prioritization of Code Debt: A Code Smell Intensity Index, Department of Informatics, Systems and Communication, University of Milano-Bicocca, Milano, Italy, 2015 IEEE 7th International Workshop on Managing Technical Debt (MTD), Bremen Germany, pp. 16-24.

Francesca Arcelli Fontana, et al., Poster: Filtering Code Smells Detection Results, Department of Informatics, Systems and Communication, University of Milano-Bicocca, Milano, Italy, 2015 IEEE/ACM 37th IEEE International Conference on Software Engineering, Florence, Italy, pp. 803-804.

* cited by examiner

LUCIDCHART LINK

1. BHive CREATES SQS PROCESSING MESSAGES FOR EACH CONSECUTIVE COMMIT PAIR, PASSING IN EACH COMMIT'S SOURCE CODE SNAPSHOT LOCATION (IN S3) AND THE LIST OF INSIGHTS FOR EACH OF THE TWO COMMITS.
2. EACH CA INSTANCE RUNS IN ITS OWN DOCKER CONTAINER, DOWNLOADING THE SOURCE CODE FOR BOTH COMMITS TO TRACK INSIGHTS OVER TIME. MULTIPLE CA INSTANCES CAN RUN IN PARALLEL, EACH PROCESSING AN SQS MESSAGE (IN ANY ORDER).
3. CA WALKS THROUGH THE SOURCE CODE FILE HIERARCHY FOR EACH OF THE TWO COMMITS, CREATING A LIST OF FILES. A FILE CAN EXIST IN BOTH COMMITS (IN THE SAME LOCATION WITH THE SAME NAME), OR IN EITHER OF THE COMMITS.
    A. FOR EACH SOURCE FILE COMMON TO BOTH COMMITS, AND EITHER CONTAINS ONE OR MORE INSIGHTS, CA INVOKES THE 3RD-PARTY GumTree LIBRARY.
    B. GumTree CREATES ASTs FOR THE TWO FILE VERSIONS (ONE IN EACH COMMIT) AND RETURNS A POJO REPRESENTING THE DIFFERENCES BETWEEN THE TWO ASTs, i.e., THE CODE DIFFERENCES BETWEEN THE TWO FILE VERSIONS.
4. FOR EACH INSIGHT IN EACH FILE, CA DETERMINES THE CODE EVOLUTION METRICS:
    A. IF THE FILE EXISTS IN BOTH COMMITS, THE METRIC CAN BE ONE OR ARSON, DECAY, OCCURRENCE, OR RESOLVED.
    B. IF THE FILE EXISTS ONLY IN THE EARLIER COMMIT, THE INSIGHT IS RESOLVED.
    C. IF THE FILE EXISTS ONLY IN THE LATER COMMIT, THE INSIGHT IS ARSON.
    D. ADDITIONALLY, CONTRIBUTION AND IMPACT ARE MEASURED AND ASSOCIATED WITH THE COMMIT DEVELOPER.
5. THESE METRICS ASSOCIATED WITH EACH INSIGHT ARE WRITTEN TO THE BHive DB (MySQL).
6. CA NOTIFIES BHive WHEN DONE.

FIG. 3

| 14843 | 188 | 79.0 | 14773 | 42 | 65 |
|---|---|---|---|---|---|
| Lines Commited | Total Commits | Lines per commit | Lines of clean code | Lines of decay | Lines of arson |

Recommendations

⚠ Make incremental commits.

You have made 2 commits with > 100 lines changes in code this month. Aim to commit more frequently, with incremental changes  <

⚠ You caused 65 instances of arson this quarter. Avoid these mistakes in future  >

⊘ No decay this quarter! Keep up the good work.  >

⚠ Increase your commit frequency from 3 to at least 10 per week.  >

FIG. 12

| 14843 | 188 | 79.0 | 14773 | 42 | 65 |
|---|---|---|---|---|---|
| Lines Commited | Total Commits | Lines per commit | Lines of clean code | Lines of decay | Lines of arson |

Recommendations

⚠ Make incremental commits. >

⚠ You caused 65 instances of arson this quarter. Avoid these mistakes in future <

The issue types with which you caused maximum impact this quarter are: 1. "@Override" should be used on overriding and implementing methods 2. Public static fields should be constant 3. Memory Leak. Please read up on these issues, understand why they accrue technical debt, make a conscious effort towards avoiding them, The goal is to bring this down to zero, but let's start by halving this next quarter.

⊘ No decay this quarter! Keep up the good work. >

⚠ Increase your commit frequency from 3 to at least 10 per week. >

FIG. 13

Arson ⑦

| Org/Repo | Issue Type | Commit | Lines | Links |
|---|---|---|---|---|
| trilogy-group/acr-devfactory-codeserver-framework | "@Override" should be used on overriding and implementing methods | 90b64b40801953e6983dda4802f919f25667bec1 | 1 | Link |
| trilogy-group/acr-devfactory-codeserver-framework | Memory Leak | 057d2bc1b46d692f0f8da922a0c9b27ce8760b32 | 1 | Link |
| trilogy-group/acr-devfactory-codeserver-framework | Lazy initialization of "static" fields should be "synchronized" | 764ea16d532e7ea808ded363ec99118ef1691710 | 1 | Link |
| trilogy-group/acr-devfactory-codeserver-framework | Public static fields should be constant | 4a1dbca3c7a9ec20dce9a12f8fd85aaefef6f550 | 1 | Link |
| trilogy-group/acr-devfactory-codeserver-framework | Public static fields should be constant | 764ea16d532e7ea808ded363ec99118ef1691710 | 1 | Link |
| trilogy-group/acr-devfactory-codeserver-framework | "@Override" should be used on overriding and implementing methods | 327e0f8f78e31e41bbf55c9880570d261223b606 | 1 | Link |
| trilogy-group/acr-devfactory-codeserver-framework | Public static fields should be constant | 764ea16d532e7ea808ded363ec99118ef1691710 | 1 | Link |
| trilogy-group/acr-devfactory-codeserver-framework | "@Override" should be used on overriding and implementing methods | 764ea16d532e7ea808ded363ec99118ef1691710 | 1 | Link |

FIG. 15

Decay

| Org/Repo | Issue Type | Commit | Lines | Links |
|---|---|---|---|---|
| | | No Data Available | | |

Commits

| Org/Repo | Commit | Date | Lines Added | Lines Deleted | Total Issues | Links |
|---|---|---|---|---|---|---|
| trilogy-group/acr-devfactory-codeserver-framework | 77a972860b45a2eb06fd49fb1505e89f531a2a53 | 09/06/2017 | 1 | 1 | 40 | Link |
| trilogy-group/acr-devfactory-codeserver-framework | 7c475cfe90edfd3220ade26c75f5ca2132a7f44a | 09/05/2017 | 4 | 0 | 40 | Link |
| trilogy-group/acr-devfactory-codeserver-framework | 0949a333d7017828b0bfa282c45a4fffaab8dc8e | 09/05/2017 | 883 | 869 | 40 | Link |
| trilogy-group/acr-devfactory-codeserver-framework | 9bc08557a5fe12ed4e49240a4fea65eef9b8eea5 | 09/05/2017 | 2 | 0 | 40 | Link |
| trilogy-group/acr-devfactory-codeserver-framework | df874e08bef6cb159efbe04d5581886ecfcf3d85 | 09/05/2017 | 1 | 1 | 40 | Link |
| trilogy-group/acr-devfactory-codeserver-framework | 056e4401aa95ce908310dcba76827b5fcc12751d | 09/05/2017 | 5 | 144 | 40 | Link |
| trilogy-group/acr-devfactory-codeserver-framework | 8b5e924b253f58f1498ff7cf0482f6f5f2522a9c | 09/04/2017 | 1 | 0 | 40 | Link |

FIG. 16

Arson ?

| Org/Repo | Issue Type | Commit | Lines | Links |
|---|---|---|---|---|
| trilogy-group/acr-devfactory-codeserver-framework | "@Override" should be used on overriding and implementing methods | 90b64b40801953e6983dda4802f919f25667bec1 | 1 | Link |
| trilogy-group/acr-devfactory-codeserver-framework | Memory Leak | 057d2bc1b46d692f0f8da922a0c9b27ce8760b32 | 1 | Link |
| trilogy-group/acr-devfactory-codeserver-framework | Lazy initialization of "static" fields should be "synchronized" | 764ea16d532e7ea808ded363ec99118ef1691710 | 1 | Link |
| trilogy-group/acr-devfactory-codeserver-framework | Public static fields should be constant | 4a1dbca3c7a9ec20dce9a12f8fd85aaefef6f550 | 1 | Link |
| trilogy-group/acr-devfactory-codeserver-framework | Public static fields should be constant | 764ea16d532e7ea808ded363ec99118ef1691710 | 1 | Link |
| trilogy-group/acr-devfactory-codeserver-framework | "@Override" should be used on overriding and implementing methods | 327e0f8f78e31e41bbf55c9880570d261223b606 | 1 | Link |
| trilogy-group/acr-devfactory-codeserver-framework | Public static fields should be constant | 764ea16d532e7ea808ded363ec99118ef1691710 | 1 | Link |
| trilogy-group/acr-devfactory-codeserver-framework | "@Override" should be used on overriding and implementing methods | 764ea16d532e7ea808ded363ec99118ef1691710 | 1 | Link |

FIG. 17

Bottom Performers

| Developer | Commit | Lines of Arson | Lines of Decay |
|---|---|---|---|
| ∨ Alaa Nassef | 69 | 93 | 27 |
| ∨ Mohammad Juned | 7 | 1 | 0 |
| ∨ Alexey Udalykh | 2 | 0 | 2 |
| ∨ Vinay Emani | 9 | 0 | 186 |
| ∨ Karlis Zigurs | 1 | 0 | 1 |
| ∨ Virendra Kimar Patidar | 2 | 2 | 0 |
| ∨ A Korany | 3 | 0 | 0 |
| ∨ Sergey Timashev | 3 | 0 | 2 |
| ∨ Raul Guerrero Deschamps | 9 | 0 | 0 |
| ∨ Lev Boyarsky | 2 | 0 | 1 |
| ∨ Igor Naumov | 2 | 0 | 0 |

Week 3
Commits: 1
Clean lines: 24
Arson Impact: 0
Decay Impact: 1

Week 1  Week 2  Week 3  Week 4  Week 5  Week 6  Week 7  Week 8  Week 9  Week 10  Week 11  Week 12  Week 13

CODEBASE INSIGHT GENERATION AND COMMIT ATTRIBUTION, ANALYSIS, AND VISUALIZATION TECHNOLOGY

INCORPORATION BY REFERENCE

This patent application relates to U.S. Patent Application No. 16,027,072 "SYSTEM OPTIMIZED FOR PERFORMING SOURCE CODE ANALYSIS", the disclosure of which is incorporated herein by reference in its entirety. This patent application claims priority to U.S. Provisional Patent Application No. 62/915,630, which is incorporated by reference in its entirety.

FIELD OF THE INVENTION

The disclosures herein relate generally to systems that analyze developer code and that attribute code misbehaviors to particular developers to promote the development of higher quality code. The disclosures herein further generally relate to systems that analyze developer code and that provide insights to developer performance at the developer level, the team level and organization level.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 1-22 depict codebase insight generation and commit attribution, analysis, and visualization technology.

DETAILED DESCRIPTION

In one embodiment, the disclosed system includes a repository that stores developer code in a codebase to which many developers and developer teams contribute code over time. While some developers change the codebase to improve the codebase and/or make corrections, other developers may unintentionally introduce potential or real problems into the codebase through developer changes that are misbehaviors. Some typical examples of misbehaviors are the developer writing code that introduces a memory leak to the codebase or that adds undesirable white space to the codebase. The misbehavior code enters the codebase when the developer who wrote that code performs a commit operation.

The system includes one or more static analysis tools that identify misbehaviors in the codebase from a list of predetermined misbehaviors. The system includes a database that includes each commit that each developer performed on the codebase for a predetermined period of time, for example for the last month and/or for the last 3 months. The database stores all of the commits by the developers and the respective authors of the commits.

The system also includes a code attribution (CA) tool that employs abstract syntax trees (ASTs) to determine if each commit that a particular developer performs resulted in breaking the code or impairing the code (which is called "arson"), or results in a failure to correct the code (which is identified as "decay"), or if clean code results (which is identified as "clean"), as discussed below in more detail.

In another embodiment, the system includes a dashboard tool that enables a particular developer to see all of the developer's commits with misbehaviors over a predetermined period of time. The dashboard tool also enables a manager to see all of the commits with misbehaviors for the developer's team, the dashboard displaying these results developer by developer at the team level. The dashboard tool further enables a high level manager, such as a chief technology officer (CTO) to see these results at the organization level including all teams.

Figure 1:
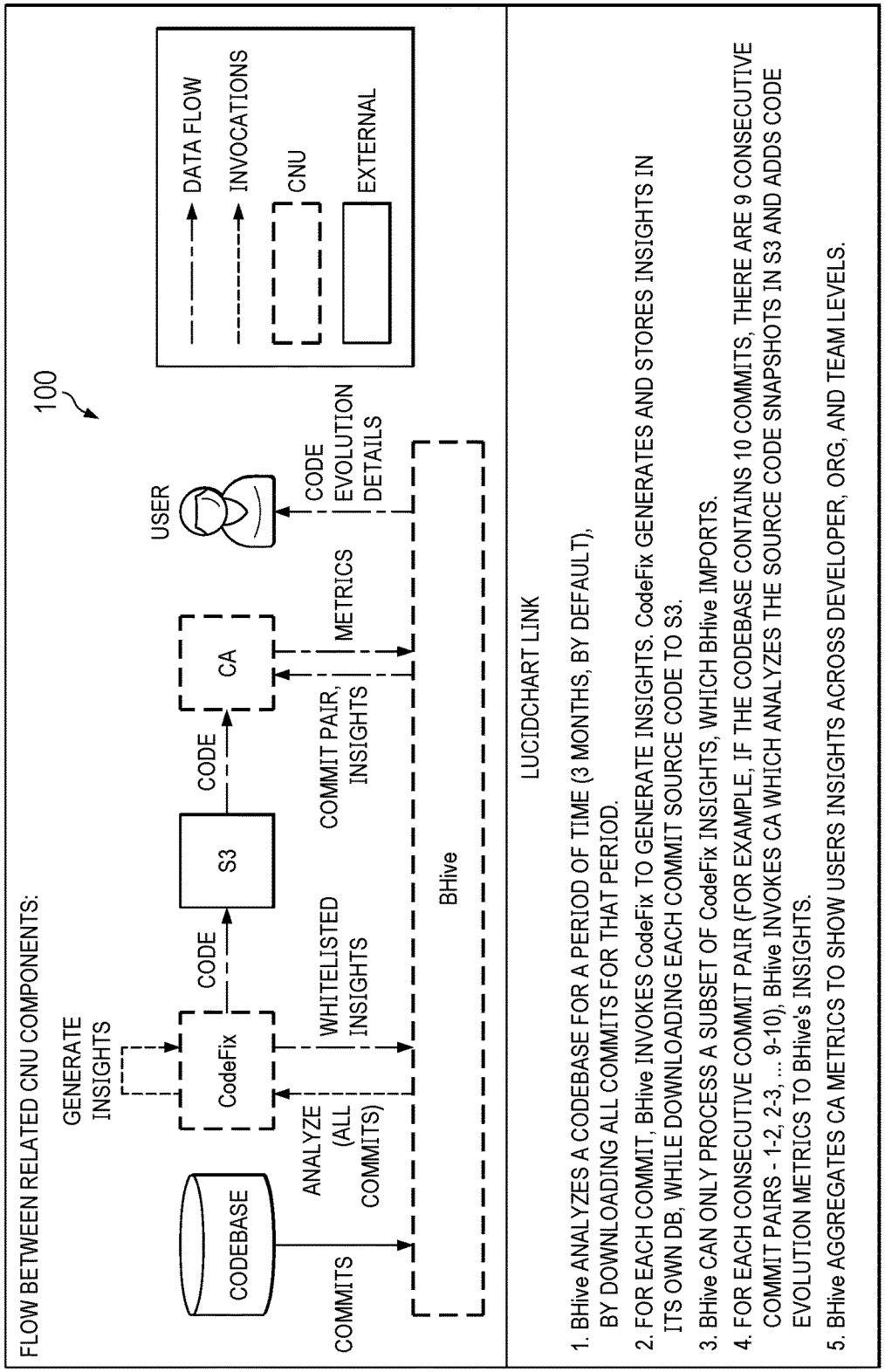

Referring to FIG. 1, the system includes a code analysis tool, designated below as BHive, that analyzes code in a codebase to identify misbehaviors.

In more detail, BHive, which represents one embodiment of the system, analyzes the codebase by downloading all commits of the codebase for a predetermined period of time, for example the last 30 days and/or the last 90 days, or other predetermined period of time. For each commit, BHive invokes the CodeFix insight generation tool to generate insights with respect to issues in the codebase. The CodeFix tool is a static analysis tool that includes sensors to locate misbehaviors, namely issues, in the codebase. Industry standard tools such as SONAR and CHECKMARX can be used to provide the insight generation portion of this static analysis tool. CodeFix generates and stores insights in its own database and downloads each commit source code to a database, namely storage designated as S3.

For each commit, BHive invokes CodeFix to generate insights. In more detail, for each consecutive commit pair (for example, if the codebase contains 10 commits, there are 9 consecution consecutive commit pairs 1-2, 2-3, . . . 9-10), the BHive code analysis tool analyzes the source code snapshots in S3 and adds code evolution metrics to BHives's insights. BHive invokes the CommitAttribution (CA) application which analyzes the source code snapshots in storage S3 and adds code evolution metrics to BHive's insights. The Commit Attribution application CA take pairs of these commits and performs a diff operation to see what happened in every commit, i.e. what is the change of the data, and to also attribute specific issues to respective specific developers.

Figure 2:
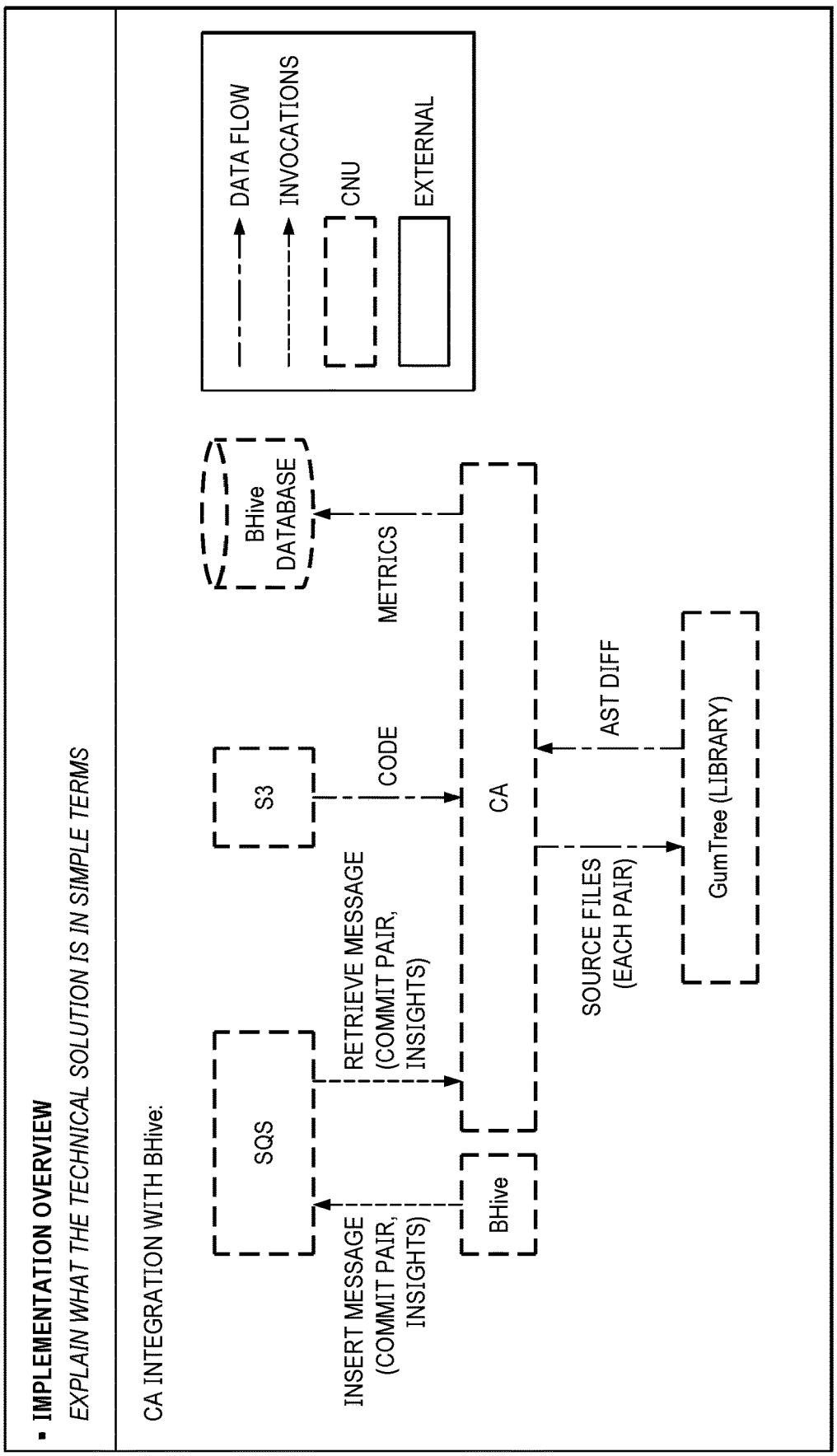

FIGS. 2 and 3 depict the commit attribution (CA) tool integration with the BHive tool. The processes described above and below are is parallelizable and scalable, and are not suitable for manual performance.

Figure 4:
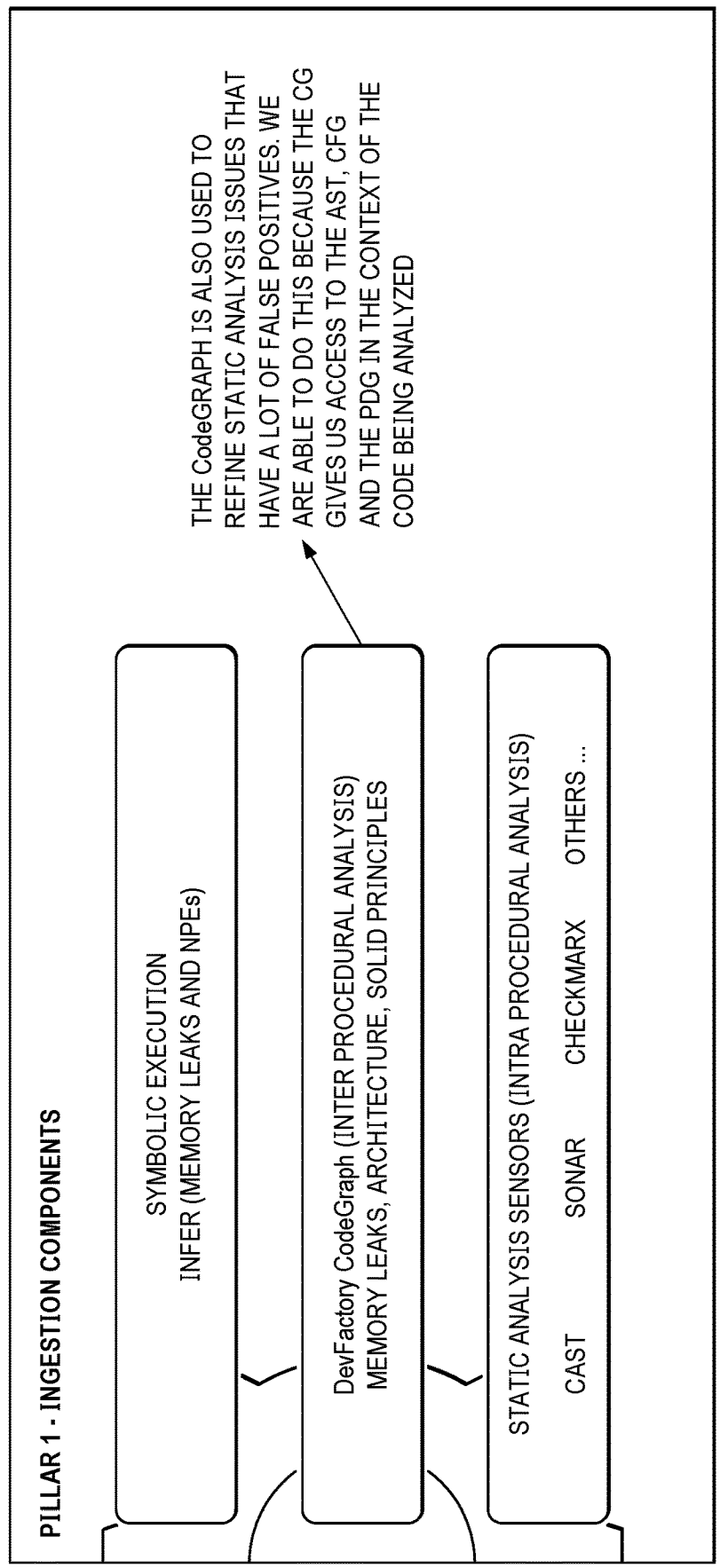

FIG. 4, Pillar 1— Ingestion Components. With respect to the sensors, the sensors can be viewed as including three different layers:

"Procedural analysis" layer—the sensors excel in finding code with issues with low false positive rates. This means that if you have issues that are within a class, within in a method, basically within a file, then CodeFix will find these issues.

"Inter-procedural Analysis"—when issues span across classes, span across different methods, and different files of the codebase, a custom CodeGraph application handles this scenario. CodeGraph is a data structure including Abstract Syntax Tree (AST), control flow graph, code dependency graph, all of that in one place, which an application can query to obtain insights. The CodeGraph tool is disclosed in U.S. Patent Application No. 16,027,072.

"Higher level insights" which is more mathematical-simulation-based, namely a tool that goes and finds issues, such as memory leaks and exceptions for the codebase.

Figure 5:
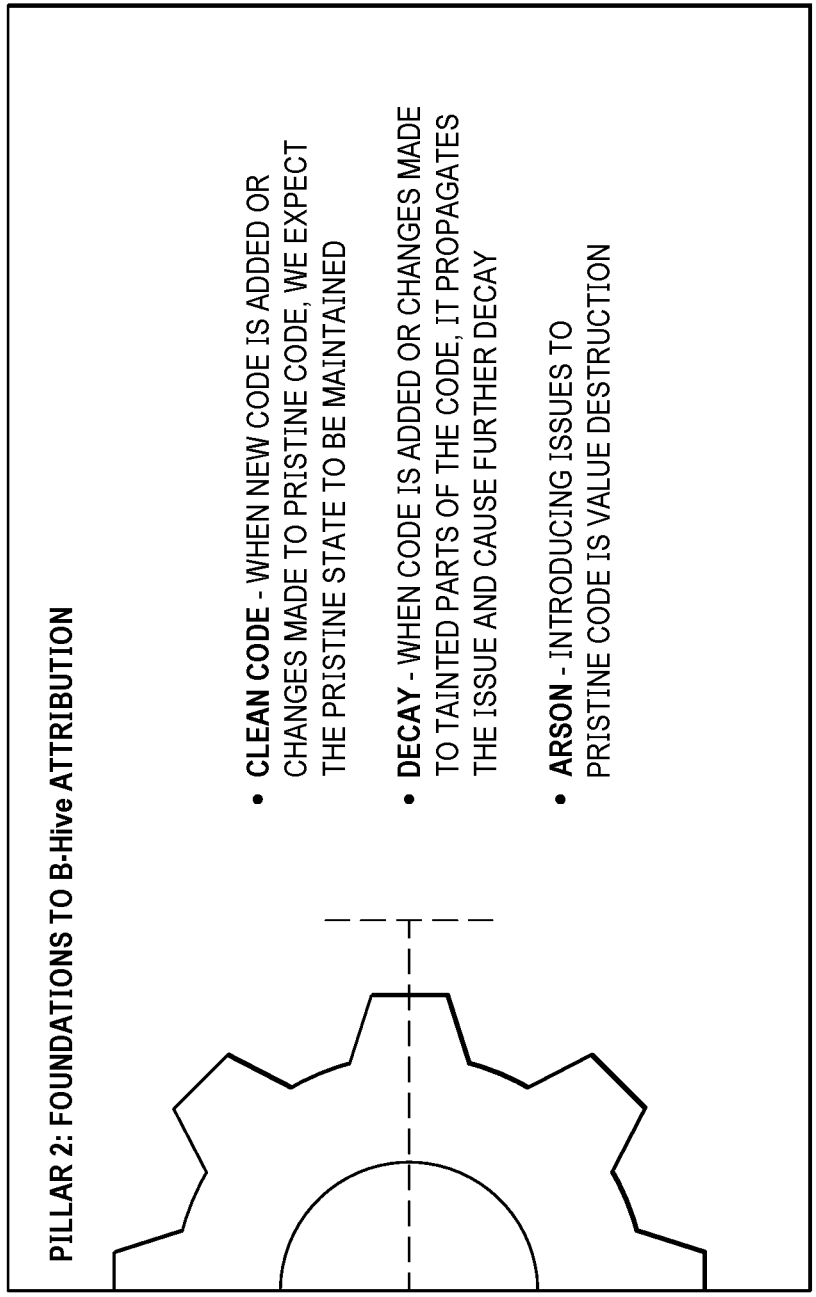

With respect to the foundations of the attribution that the CA tool provides, if you have a clean code and it is desirable that the CA tool still keep it clean. Such code is designated "clean". If a developer goes in and ruins code, or adds issues to code, this is "arson"! If a developer changes a piece of code that is already bad, that is "decay". A particular developer's mandate may not be to go fix an entire piece of bad code. Their mandate might be to just do a simple bug fix by adding two lines of code to it. This again is "decay", a fundamental mode of attribution. SEE Pillar 2 below: decay, arson, clean:

FIG. 5 depicts PILLAR 2: Foundations to B-Hive Attribution

Figure 6:
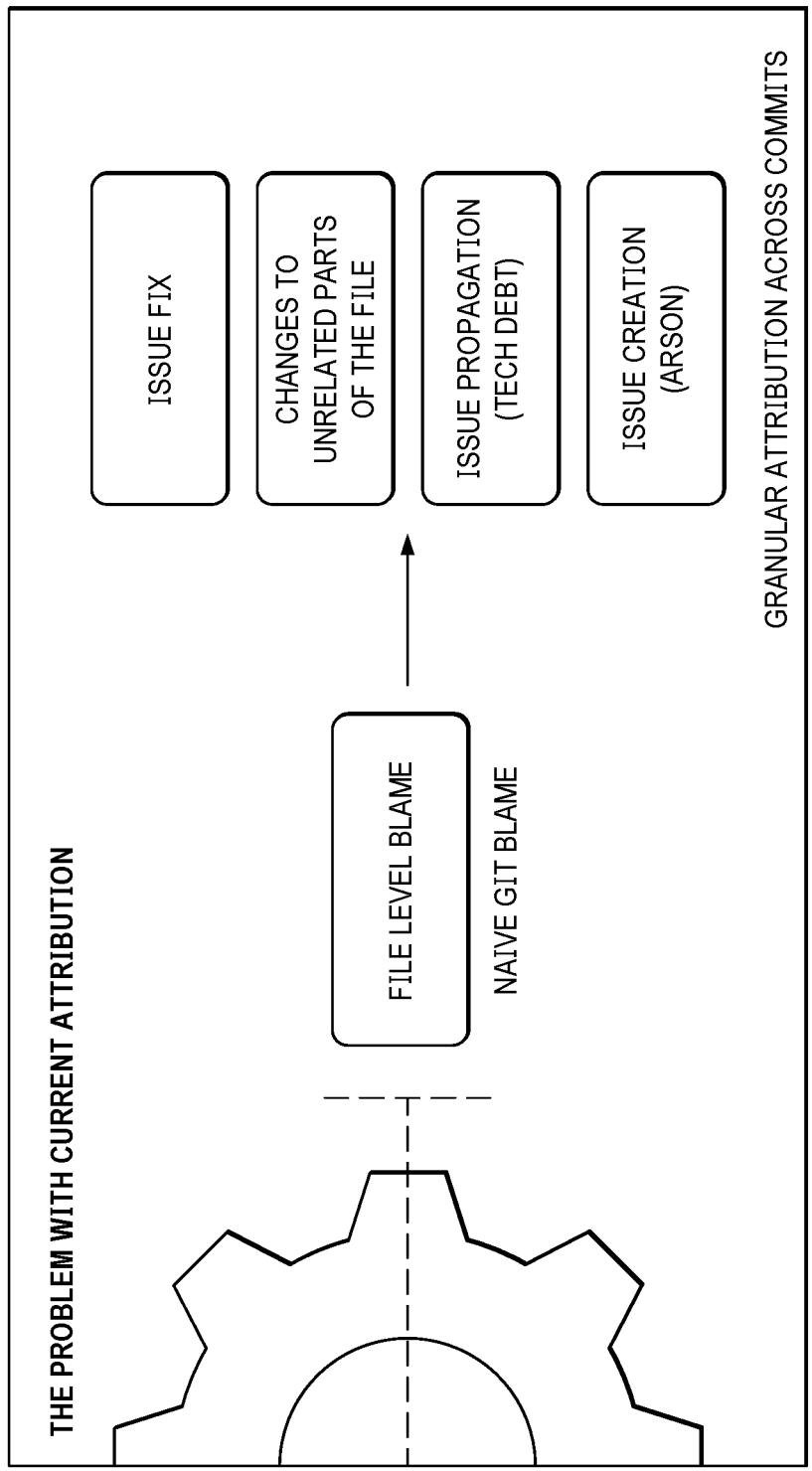

FIG. 6 depicts a problem with current attribution.

Figure 7:
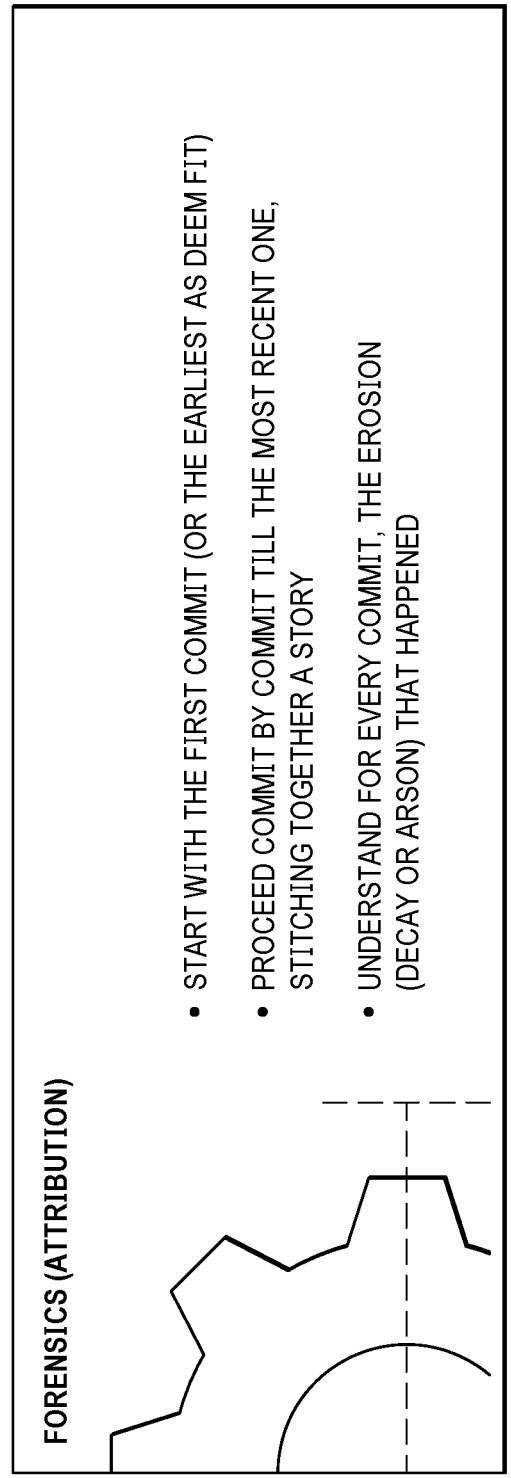

FIG. 7 depicts Forensics (Attribution).

The disclosed system includes a dashboard that enables viewing of developer metrics at 3 different levels, namely 1) a developer level, 2) a manager level, and c) an organizational level such as the chief technology officer (CTO).

Figure 8:
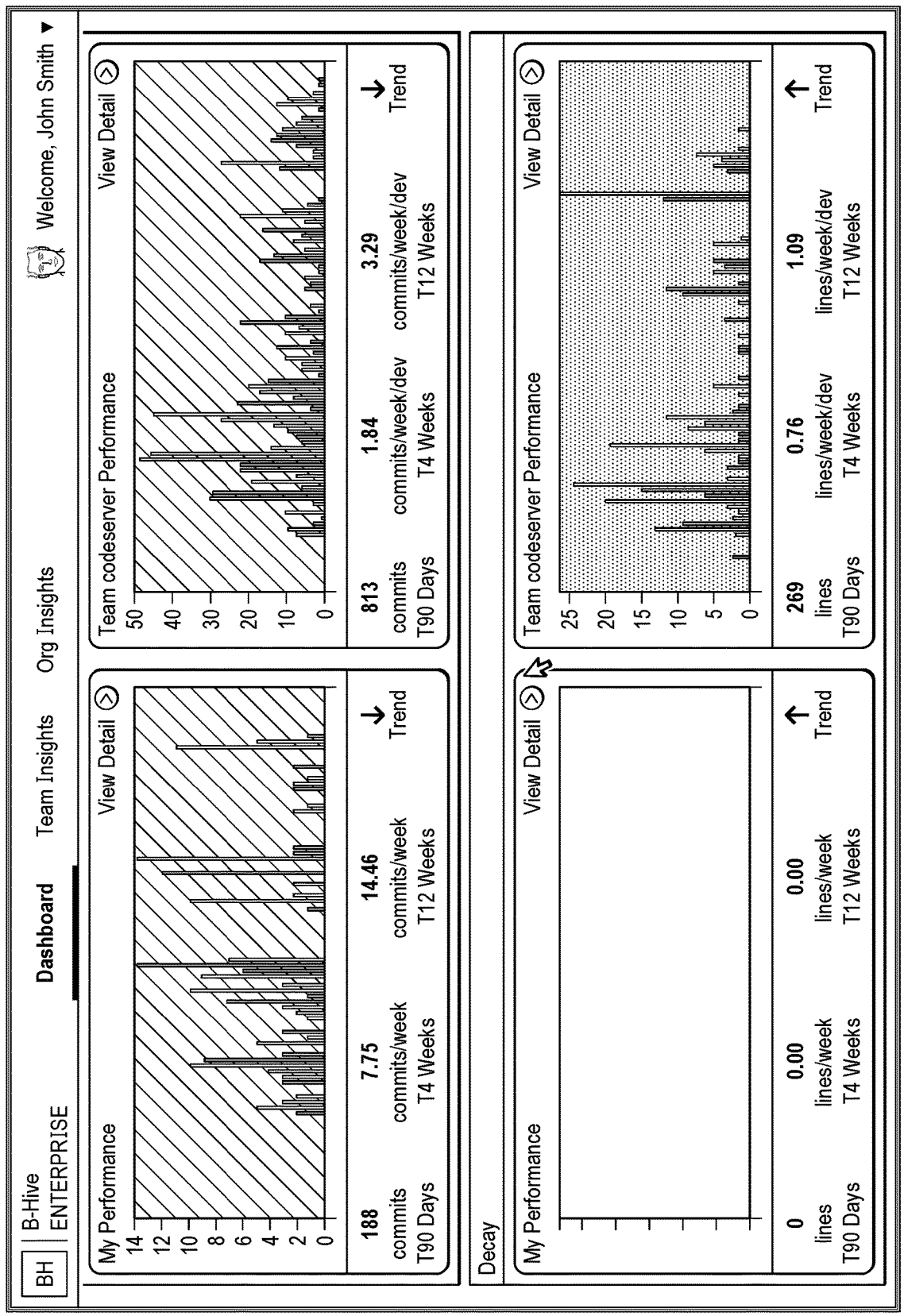
Figure 9:
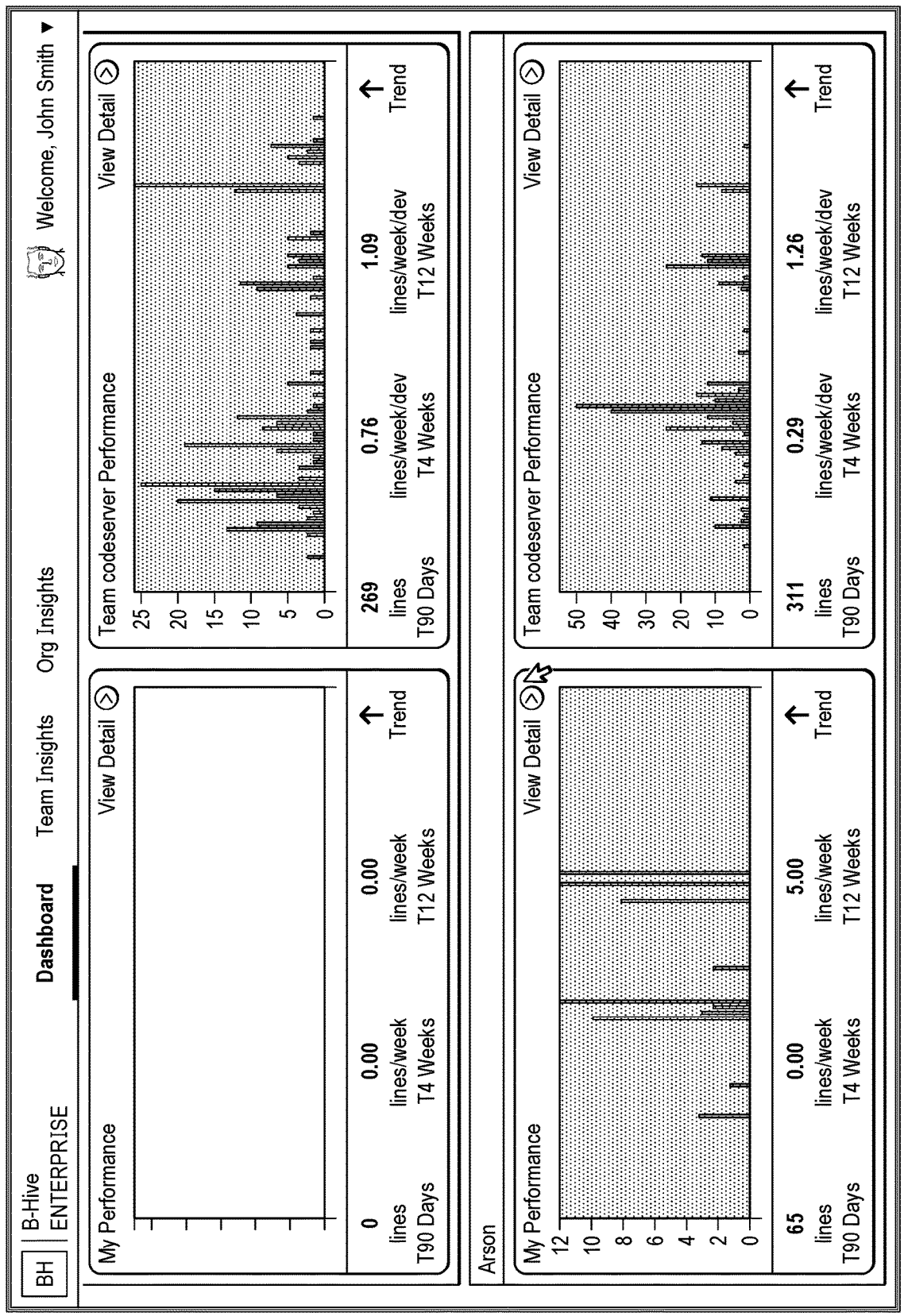

There are at least (3) views in BHive depicted in FIG. 8, namely:

1) FIG. 9, a Developer View to help the developer write better code himself/herself.
2) A Manager View to the managers coach their teams.
3) A CTO view that can help the manager go look at the entire organization, and take action on the organization.

In more detail:

1) FIG. 9. DEVELOPER VIEW:

So, as far as the developer is concerned, the developer view focusses on three metrics, namely:

1) Commits
2) Decay, and
3) Arson

Figure 10:
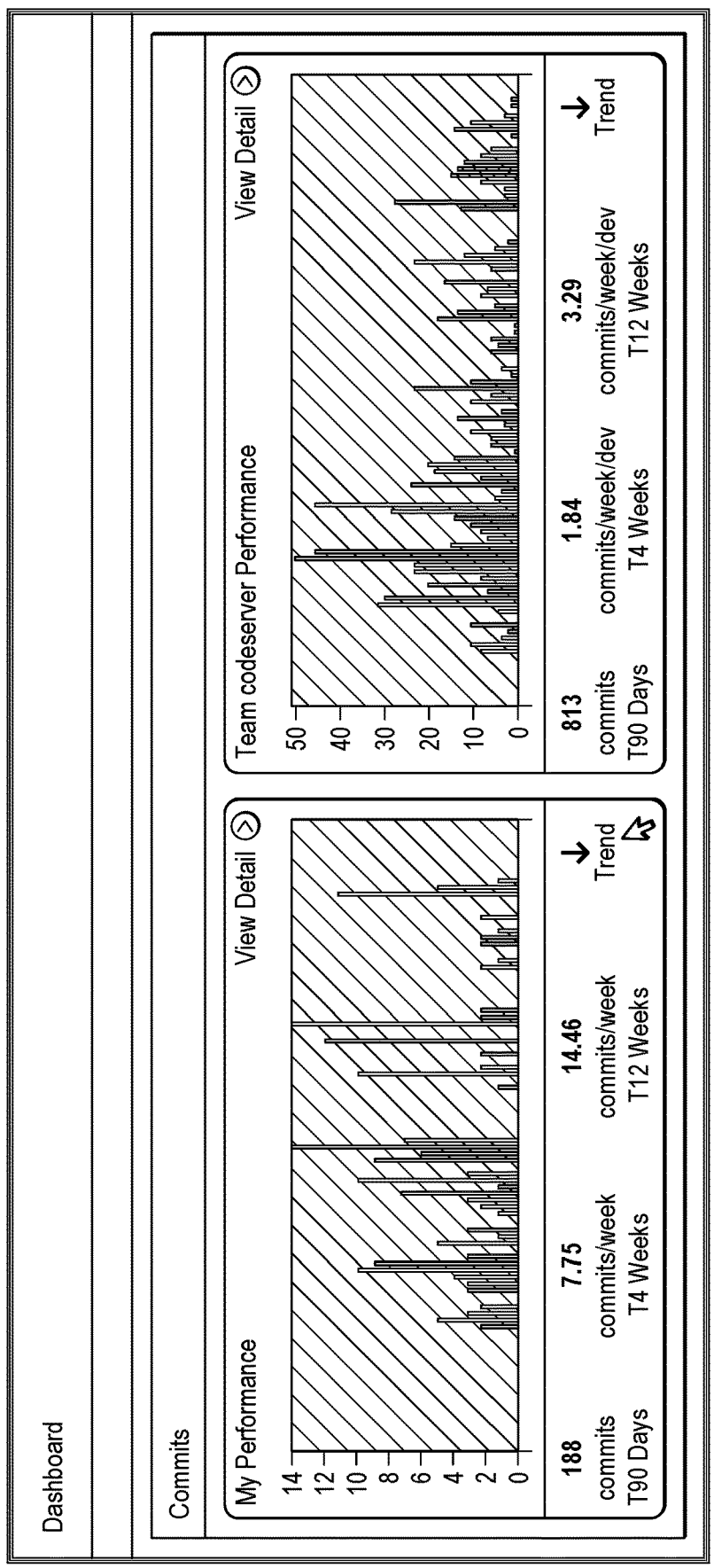

In FIG. 10, now, the signal, when it comes to commits, is when a developer does not make any commits. The signal is only on one end of the spectrum, where there are no commits.

For a developer who makes 20 commits per week, there is no distinction. It does not matter if the developer did 10 or 20 commits. But it matters if the developer makes zero commits or 10 commits. Because if the developer has zero commits, that means that the developer is not producing any work. And that is a behavior to be understood and fixed. In one embodiment, each developer should be committing at least once per day, so that whatever work the developer did, you at least saved it and it is on record. The developer does not lose that just because something went wrong with the developer's laptop.

Second, when a quantum of code checked in is small, for example less than 100 lines, then verification of those 100 lines of code or less can occur. If you commit too any lines of code in at one time, then the scrutiny of the code diminishes dramatically. So, the system is looking for a signal where there is very little code being checked in.

The other thing that the system measures, when it is significant, is the trailing four week average and the trailing 12 week average. If a developer's trailing 4 week average is better than the developer's trailing 12 week average, then the color that the tool displays on the dashboard is green. This basically says that the developer is improving, i.e. that in the last month the developer was doing much better than the previous 3 months.

The dashboard also displays the trailing 12 week averages because that is a long enough time to be able to capture some kind of a behavior pattern. Because behavior is all about making the same mistakes over and over again. So, 90 day is long enough for us to be able to do that, while being short enough to say that this is a recent behavior. What the developer did one or two years ago is not as relevant in comparison to what the developer did over the last 90 days. So, the dashboard displays the most recent behavior that you might want to go change. In one embodiment, the dashboard displays metrics on a per day basis, while in practice the dashboard may use other time periods as well. In the example of the drawing, the dashboard displays everyday metrics. The metrics labeled "my performance" are metrics on a day by day basis over a 90 day time period. The graph shows the number of commits per day that the developer makes.

And similarly, with respect to arson, the dashboard displays how many lines of arson the developer introduces per day. The developer not only get to see the developer's own metrics, the developer also gets to see how the team is performing on the same metric. So, the developer can compare the developer's own performance to the team's performance.

Figure 11:
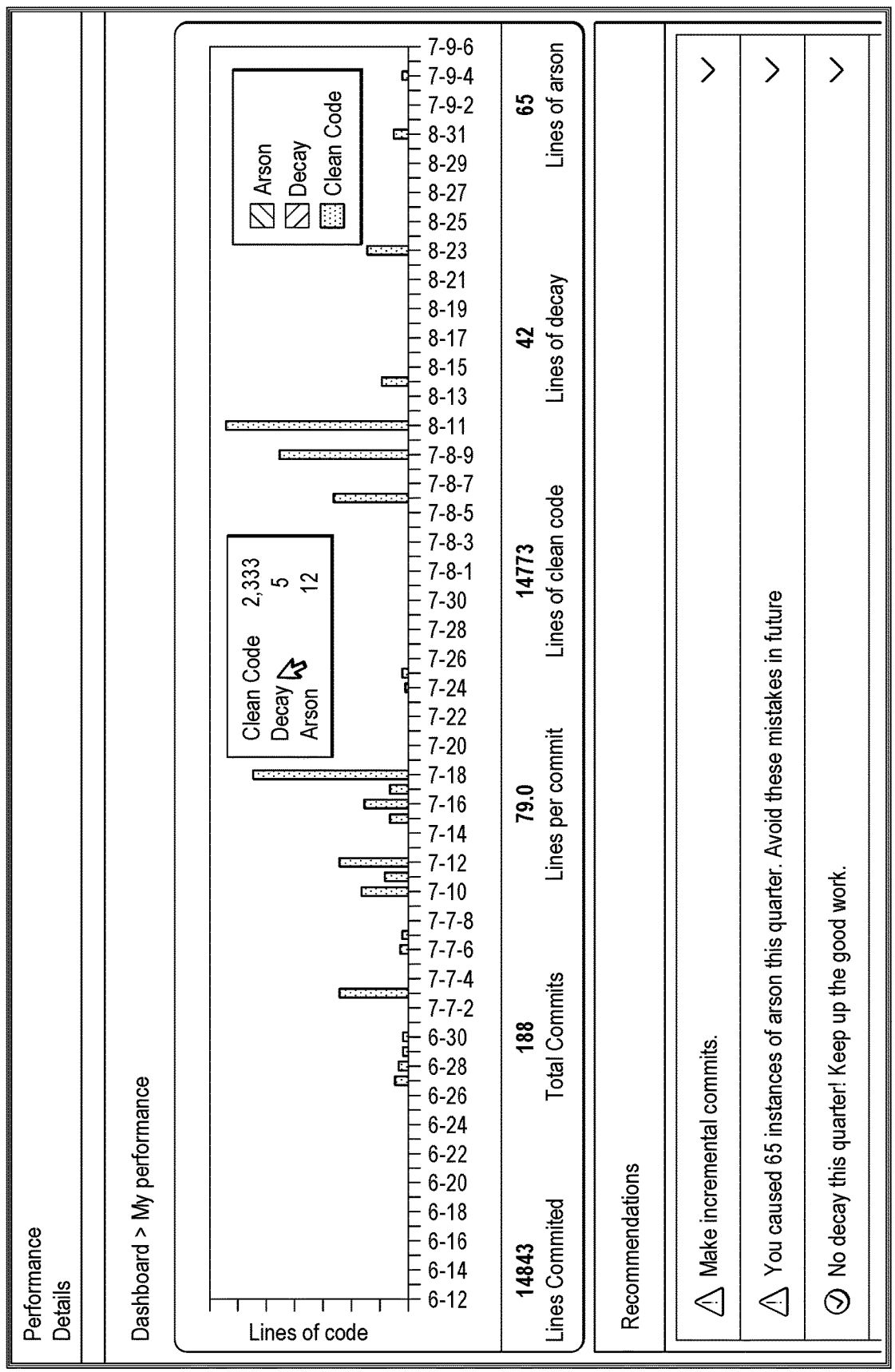

As depicted in FIG. 11, the user can dive into specific details, so that for any particular day, the user can see how much clean code that the developer checked in, and how much decay that the developer checked in, and how much arson the developer you checked in. In other words, the user can see the number of lines of clean code, decay and arson that the developer checked in.

The manager at the team level can make recommendations to a particular developer based upon the behavior seen in the drawing below:

In one embodiment, the recommendation focuses on up to three behavior changes at one time. In this particular example, the developer had 65 instances of arson this quarter and 3 behavior changes are provided in their commendation. This recommendation addresses the issues identified in the code caused by the particular developer.

These issues are derived from the inputs that the sensors provide. The number of issues on which the user can focus is only limited by the sensor data and how you can manipulate that data. From a behavior standpoint, you don't want to be changing 100 behaviors altogether, because that will be an effective. So, every quarter, 3-5 behavior changes are selected. There is insight there as well. In one embodiment, you can select 3-5 behavior changes. With respect to these metrics, is that they are shown over a period of one-quarter. It shows the developer their performance over the last 90 days at any point in time.

In one embodiment, there are two ways to decide what behaviors to change. Mode 1, is that you can go look at an entire organization and do a frequency plot of all of the different issues that you see in the codebase. And you can say that in the last 90 days I found that memory leaks are my largest issue. So, we can pick the top three priorities for the organization based on those three rules. Number one can be memory leaks. Number two can be null point exception. Number three can be another behavior.

A mechanism can compute this off-line, namely all the data on the platform. The UI does not show it here. Once a quarter, we see here are the top issues that you have from all of the sensor data that came in, and you should focus on these three issues as your priority, based on frequency. You can change behavior on an individual basis or on a team basis. But when you change that mode and say that as an organization, we are only going to focus on these 3 issues. This is more often because as far as organizations are concerned, it is easier to coach consistently three behavior changes every quarter, rather than everyone individually trying to do their own thing. So, the coaching is far more effective because the whole team is focused on changing behavior together.

Mode 2 is the organizational view—there are a many organizations that do postmortems on all of the issues that they find. If over the last quarter, a manager had 200 issues reported on a product by the customer. In performing the postmortem, the dashboard can show that memory leaks represent a large portion, as well as identifying other problems. You can identify those problems based upon what you truly see in product releases and problems that get reported by the customer.

Figure 14:
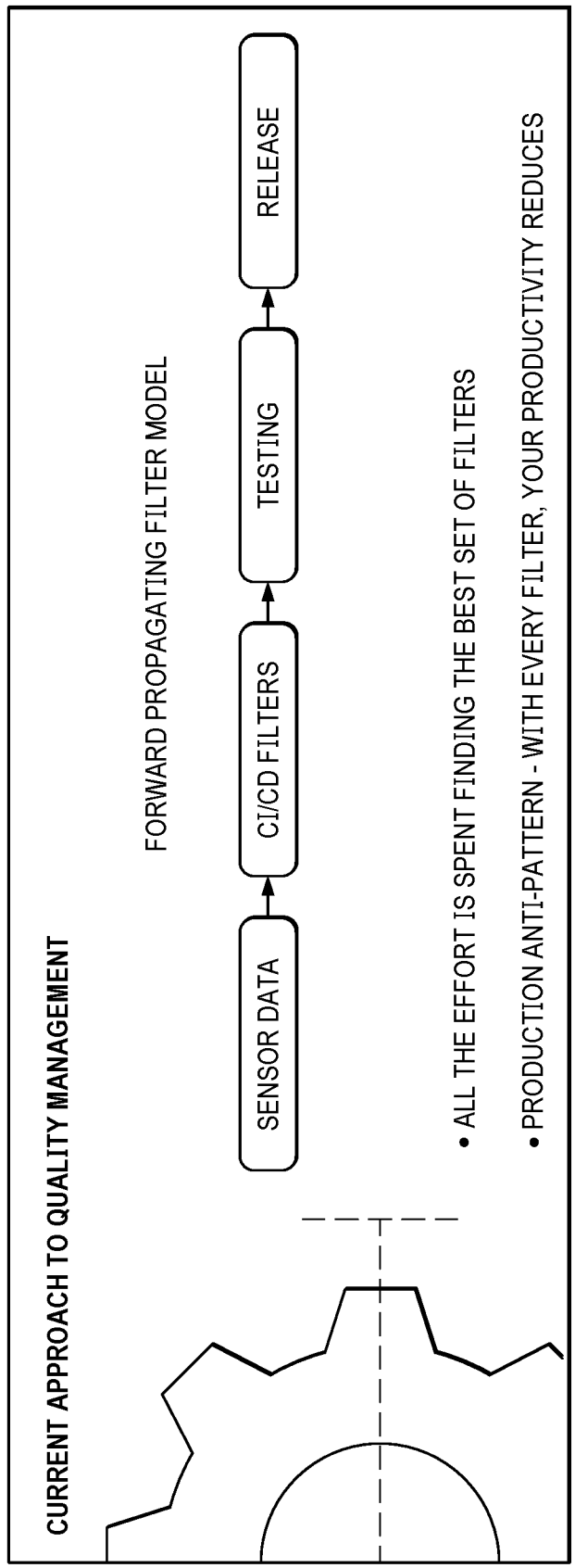

The disclosed methodology is fundamentally different from prior approaches to code quality management that typical employ filtering as depicted in FIG. 14. Sensor tools exist but other methods use these as a filter as in the above forward propagation model.

In the forward propagation model, you get all of this sensor data (in the Sensor Data block above). You put in a commit and as soon as the commit comes in, they run all of these tools and it says, there are 25 issues in the product or in this particular commit, and they may decide to reject the commit and not take it forward. Filtering in this manner provides candidate input to a CI/CD (Continuous Integration/Continuous Delivery) process.

Continuous integration is a coding philosophy and set of practices that drive development teams to implement small changes and check in code to version control repositories frequently. Because most modern applications require developing code in different platforms and tools, the team needs a mechanism to integrate and validate its changes.

Continuous delivery picks up where continuous integration ends. CD automates the delivery of applications to selected infrastructure environments.

Most teams work with multiple environments other than the production, such as development and testing environments, and CD ensures there is an automated way to push code changes to them. CD automation then performs any necessary service calls to web servers, databases, and other services that may need to be restarted or follow other procedures when applications are deployed.

So, all of these tools, whatever data they produce, they get used to filter out commits, and not to create behavior models. This is a significant distinction.

The dashboard includes a developer view in which the developer can access to see specific instances of arson or decay to really understood what happened, as for example depicted in FIGS. 15 and 16.

The sensors identified the problematic code and a link to that code the dashboard provides as link to the problematic code. The dashboard link points to source control systems, for example to GitHub, in this particular case. So, if you look at a particular link, it says GitHub and shows the commit, the file, and even the specific line numbers can be highlighted. So, to whatever particular repository you are using, the links are available.

As noted, the dashboard includes this developer view, and the developer can come in here, as for example depicted in FIG. 17, and learn how to self-improve by looking at the data to make sure they have no ARSON and no DECAY.

Figure 18:
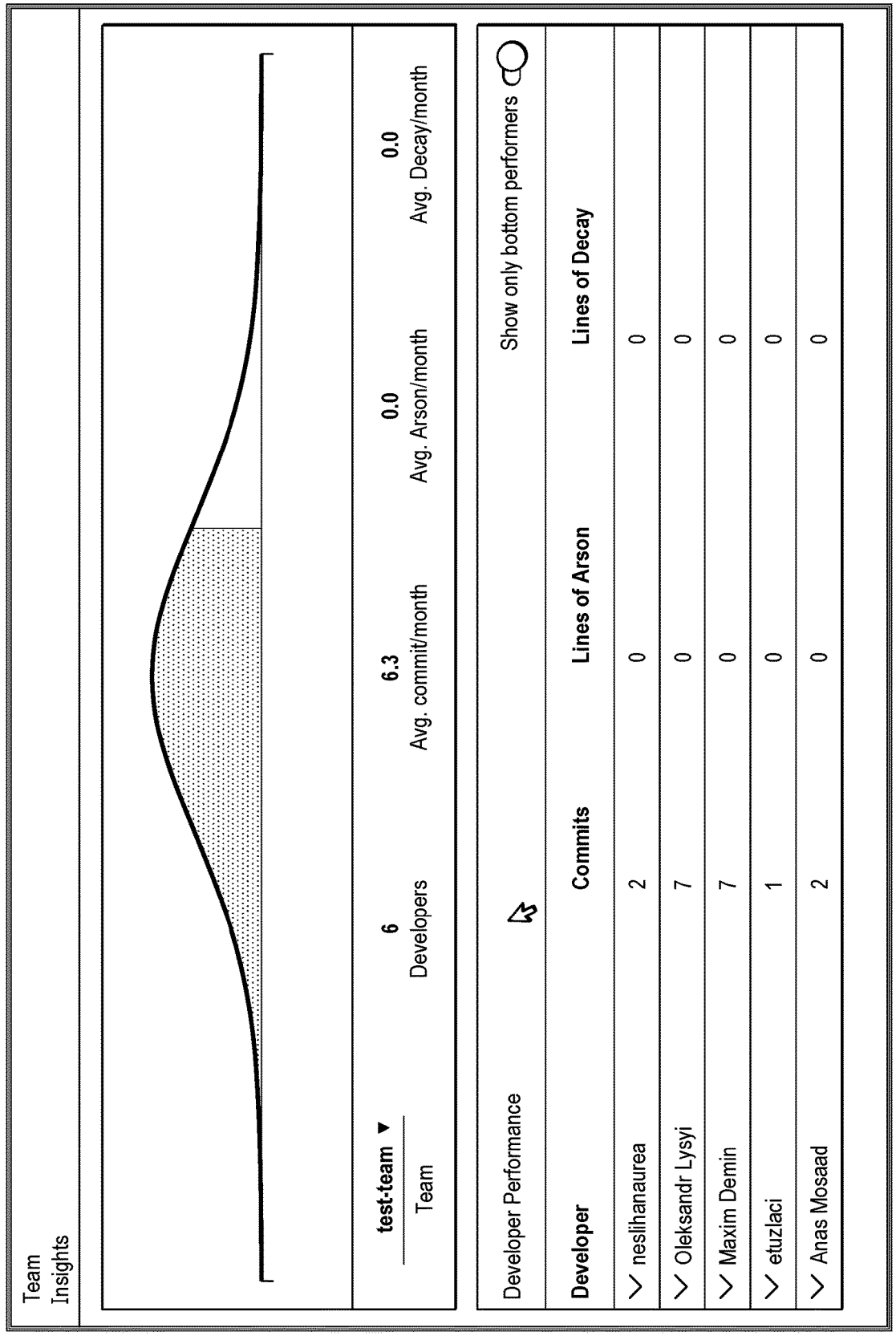
Figure 19:
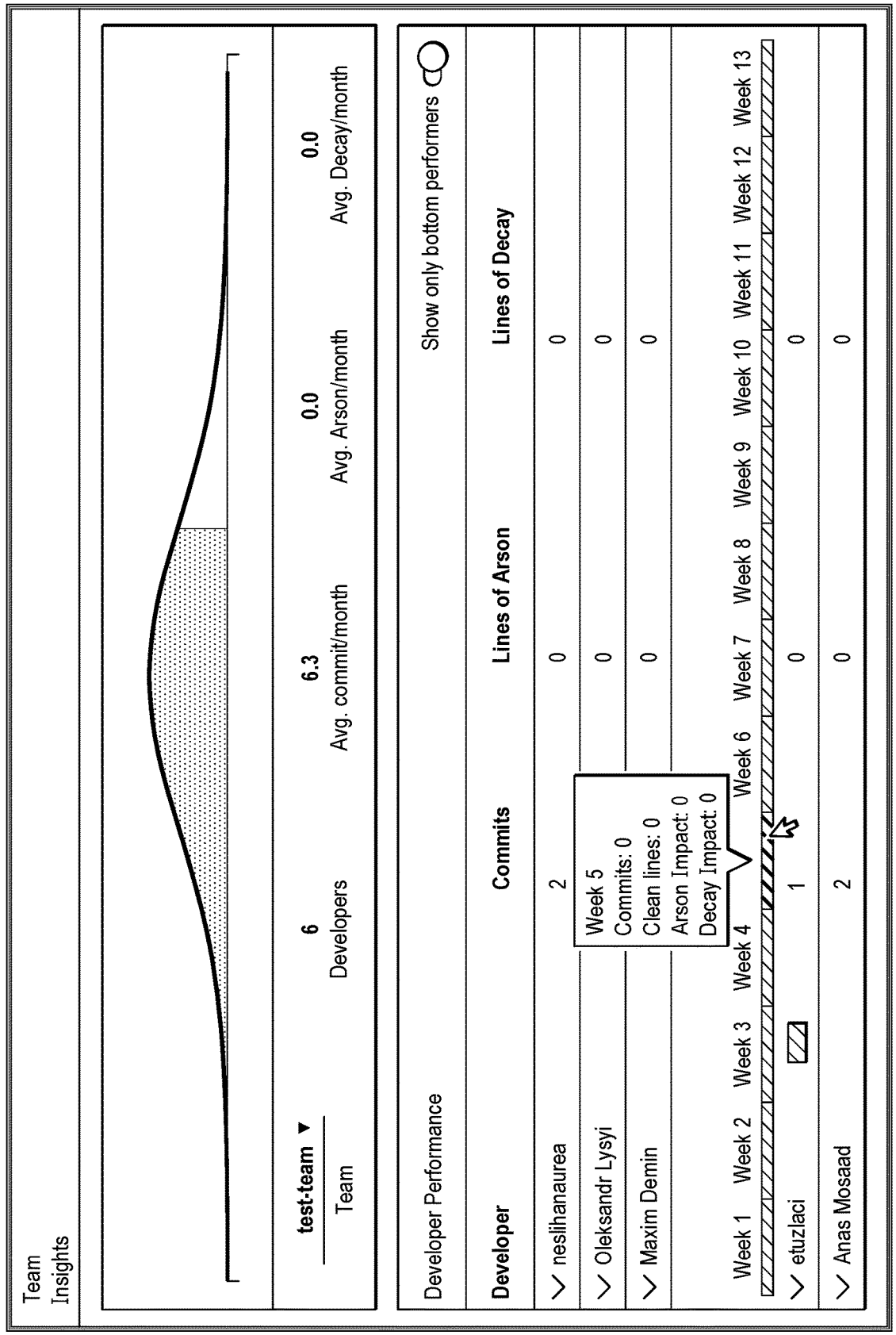

As depicted in FIG. 18, the dashboard also includes TEAM INSIGHTS VIEW that a team manager may access. The team insights view depicted in FIG. 19 displays to the manager what percentage of their team is under-performing from a behavior standpoint. The manager can look at all developers on the team. For every week the manager can see the number of commits, number of clean lines of code, arson impact and decay Impact as depicted in FIG. 19.

Using the information in the developer view, the manager can coach the developer to pay particular attention to these particular cases of arson or decay or just the fact that the developer has not committed any work. In a short conversation with the developer each week, the manager can efficiently affect their behavior using the above information for the upcoming week. Since the dashboard tool displays a sliding 90 day window, it provides the manager with helpful data points with respect to whether the developer is improving, or not. Moreover, the dashboard tool is completely data objective.

Figure 20:
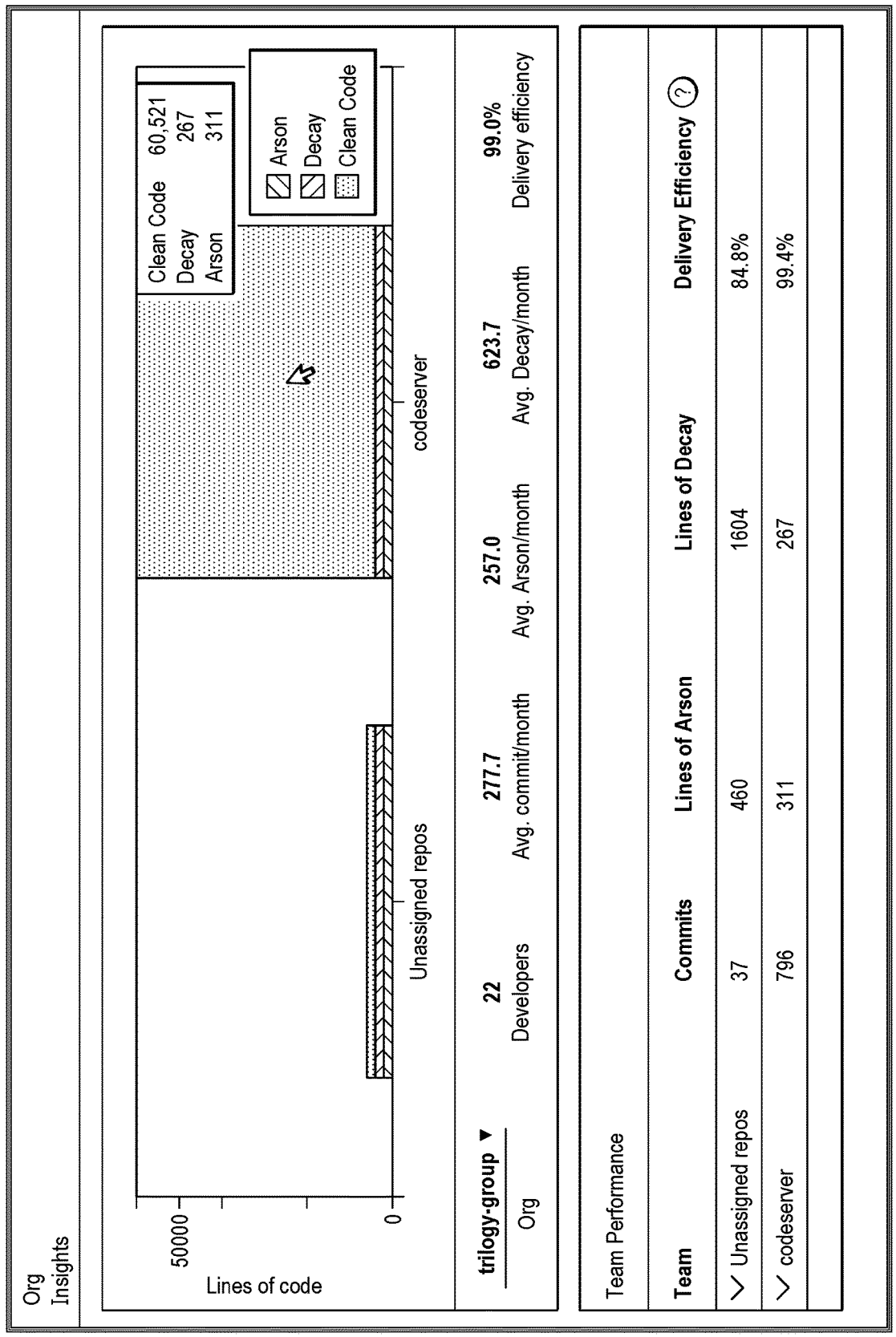

The dashboard also includes ORGANIZATION INSIGHTS VIEW as, for example depicted in FIG. 20, that an organizational manager such as a CTO may access to view developer performance information across teams, i.e. how teams are performing.

As one example depicted in FIG. 21, the dashboard tool shows the organization manager that one team is producing much code with very little arson and decay, whereas it shows that another team that is not producing much code is actually producing code with much arson and decay. In this view, the dashboard shows performance team by team across the organization. Across the entire organization, the dashboard can show the developers with the best performance and the worst performance.

Figure 22:
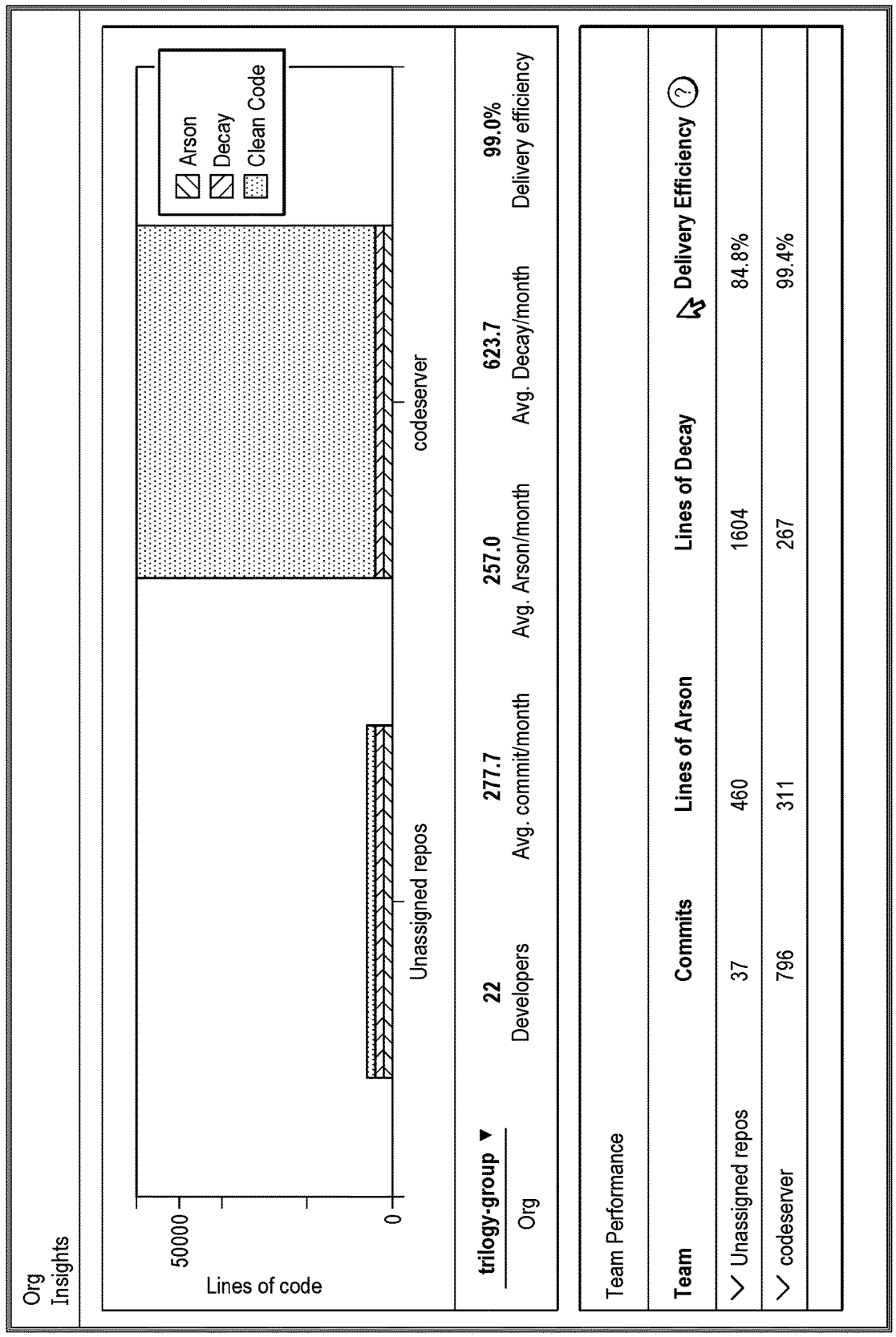

Referring to FIG. 22, the dashboard also handles the negative lines of code scenario where some really good developers come into codebases and they clean them up, simplify them, and thus create large negative lines of code. Large negative lines of code are good. When a developer improves the number of lines of code, they get attribution toward clean code committed. They do not get dinged on the arson or the decay, and that matters significantly. The dashboard tool looks at the developer's delivery efficiency, i.e. the ratio of the number of clean lines of code to the total lines of code committed. This ratio is designated—delivery efficiency".

The term" delivery efficiency" did not previously exist. It is desirable to measure our developer efficiency. Of all the lines of code that they are writing, how many of these lines of code need to be rewritten at some point in time. Conversely, it is also helpful for the dashboard tool to display how many lines of clean code developers are producing in comparison to all of the total lines of code that they are writing.

The behavior model is all about looking at what the developers are doing today, attributing to them accurately, and changing their behavior. So, if you have a process that is lossy from an information standpoint, so say that you are squashing commits as you are merging them, then basically all of the attribution, all of the nuanced commit information is lost. So, you cannot do this kind of analysis on that. So that is where we recommend change in behavior for how you do development.

Delivery efficiency is the total number of clean lines divided by the total number of lines committed. This definition refers to actual lines of code. Comments are not counted. These are the actual lines of code that developers change and introduce. The CA tool performs attribution on the AST basis, as discussed below in more detail. The AST includes no comments—the AST is code only and ignores comments.

The dashboard tool can display different insights at the developer level, the team level and the organization level:

Developer Level

The developer level insights that the dashboard tool provides are the most detailed and they allow the developer to literally dive into every specific instance of the issues that they created. It is for self-coaching. So, all of the data that you need to improve yourself, with all of the instances of attribution done, and the behavior computed. All that is available to the developer.

Team Level

At the team level, the dashboard provides the team manager with a 13 week (90 day) review going developer by developer if needed. The manager can have a conversation with the developer and coach the developer regarding the specific aspects that they should be improving. This is basically to enable the manager to have that conversation with their team with a view to decreasing misbehaviors and increasing code quality.

Org Level

The dashboard tool at the organizational level displays a comparison of the performance of one team with respect to another to see which teams are producing code with higher efficiency versus the other. And you also want to be able to stack rank your entire developer base and find the top 25% performers and the bottom 25% performers across the organization. This enable es the organization level manager to take an organization level view for fixing these misbehavior problems by for example bringing in external coaches, or setting up a training program for the organization where all of these developers can be coached and trained together to reduce misbehaviors and to increase the quality of the codebase. To change the developers' behavior, you want them to be conscious of the code that they are writing and committing in the first place.

The tools in the disclosed system perform operations that can not be performed manually. The above-described automated processes are necessary to provide a practical system that produced suitable results at the developer level, the team level and the organizational level. The methodologies disclosed herein are not the way that a human would attempt to perform.

The code attribution (CA) tool determines attribution of code that is arson, decay or clean in the following manner. The CA tool converts 2 commits to ASTs and with one node of the AST being known, the CA tool looks for a match in the AST for the other commit. In other words, the CA tool attempts to find a matching AST if it can for the other commit. And based upon those 2 commits being timed, and more particularly whether one commit occurs before or after the other, the CA tool determines the attribution of that line in the databases being DECAY or ARSON. Attribution is with respect to the particular developer that made the commit that the CA tool analyzes.

Commit Attribution (CA) is the BHive component which identifies bad patterns and identifies the developer who introduced them, allowing BHive to track them over time.

These insights answer questions such as:
When was an issue introduced?
How long did it take for the issue to get fixed?
Who introduced it?
How do you compare two developers in terms of bad-code generation?
What is the ratio of a developer's bad code to clean code over a month?

The CA tool tracks bad patterns (anti-patterns) using Abstract Syntax Trees (ASTs) to represent the source code structure of the codebase. The CA tool detects relevant code changes using ASTs and their diffs. This is more accurate than conventional line-diffing tools, as it goes beyond syntactic changes to determine semantic differences. Tracking code structure with an AST is reliable across commits that change line numbers and variable names, allowing accurate tracking of when and who introduced a pattern. In one embodiment, the complexity of creating and comparing Abstract Syntax Trees (ASTs) is handled by the open source library, GumTree. CA's tracking of changes via ASTs is more accurate for code evolution than comparing source code lines. Line comparisons perform poorly when tracking changes over time (multiple commits) and identifying original authors. The CA tool produces outputs such as Code metrics describing code evolution over time. The CA tool detect relevant code changes using ASTs and their diffs. This is more accurate than conventional line-diffing tools, as it goes beyond syntactic changes to determine semantic differences.

In the CA tool, each CA instance runs in its own Docker container, downloading the source code for both commits to track insights over time. Multiple CA instances can run in parallel, each processing an SQS message in any order in one embodiment. The CA tool walks through the source code file hierarchy for each of the two commits, creating a list of files. A file can exist in both commits (in the same location with the same name), or in either of the commits. For each source file common to both commits, and either contains one or more insights, CA invokes the 3rd-party GumTree library. This library can create ASTs for the two file versions (one in each commit) and returns a POJO representing the differences between the two ASTs, i.e. the code differences between the two file versions.

For each insight in each file, CA determines the code evolution metrics, namely: a) If the file exists in both commits, the metric can be one of Arson, Decay, Occurrence, or Resolved; b) if the file exists only in the earlier commit, the insight is Resolved;) if the file exists only in the later commit, the insight is Arson; d) additionally the CA tool measures contribution and impact and associated with the particular commit developer. The CA tool writes these metrics associated with each insight to BHive. The CA tool notifies BHive when done.

The drawing below is a representation of a data processing system that can be used to store execute the codebase, the BHive tool, the CodeFix tool (sensor tool), the S3 database that receives CodeFix outputs, and the CA tool. In one embodiment, each tool may have its own data processing system such as the system of the drawing above.

Figure 23:
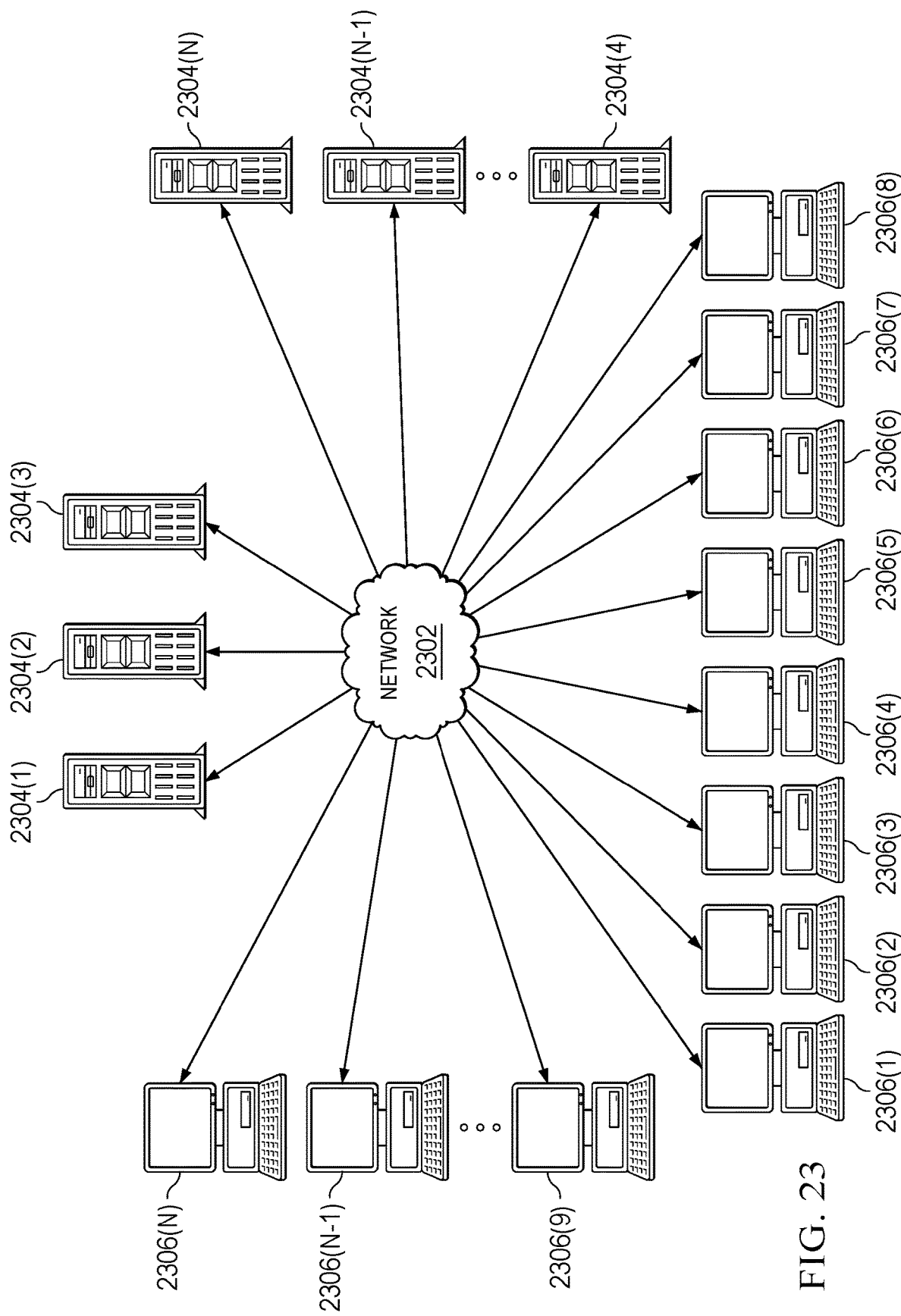
FIG. 23 depicts an exemplary network environment in which the data analysis and visualization technology may be practiced.

FIG. 23 is a block diagram illustrating a network environment in which a codebase insight generation and commit attribution, analysis, and visualization technology may be practiced. Network 2302 (e.g. a private wide area network (WAN) or the Internet) includes a number of networked server computer systems 2304(1)-(N) that are accessible by client computer systems 2306(1)-(N), where N is the number of server computer systems connected to the network.

Communication between client computer systems 2306(1)-(N) and server computer systems 2304(1)-(N) typically occurs over a network, such as a public switched telephone network over asynchronous digital subscriber line (ADSL) telephone lines or high-bandwidth trunks, for example communications channels providing T1 or OC3 service. Client computer systems 2306(1)-(N) typically access server computer systems 2304(1)-(N) through a service provider, such as an internet service provider ("ISP") by executing application specific software, commonly referred to as a browser, on one of client computer systems 2306(1)-(N).

Client computer systems 2306(1)-(N) and/or server computer systems 2304(1)-(N) may be, for example, computer systems of any appropriate specialized machine design, including a mainframe, a mini-computer, a personal computer system including notebook computers, a wireless, mobile computing device (including personal digital assistants, smart phones, and tablet computers). When programmed to implement at least one embodiment of the codebase insight generation and commit attribution, analysis, and visualization technology, the computer systems are specialized machines. These computer systems are typically information handling systems, which are designed to provide computing power to one or more users, either locally or remotely. Such a computer system may also include one or a plurality of input/output ("I/O") devices coupled to the system processor to perform specialized functions. Tangible, non-transitory memories (also referred to as "storage devices") such as hard disks, compact disk ("CD") drives, digital versatile disk ("DVD") drives, and magneto-optical drives may also be provided, either as an integrated or peripheral device. In at least one embodiment, the codebase insight generation and commit attribution, analysis, and visualization technology can be implemented using code stored in a tangible, non-transient computer readable medium and executed by one or more processors. In at least one embodiment, the codebase insight generation and commit attribution, analysis, and visualization technology can be implemented completely in hardware using, for example, logic circuits and other circuits including field programmable gate arrays.

Figure 24:
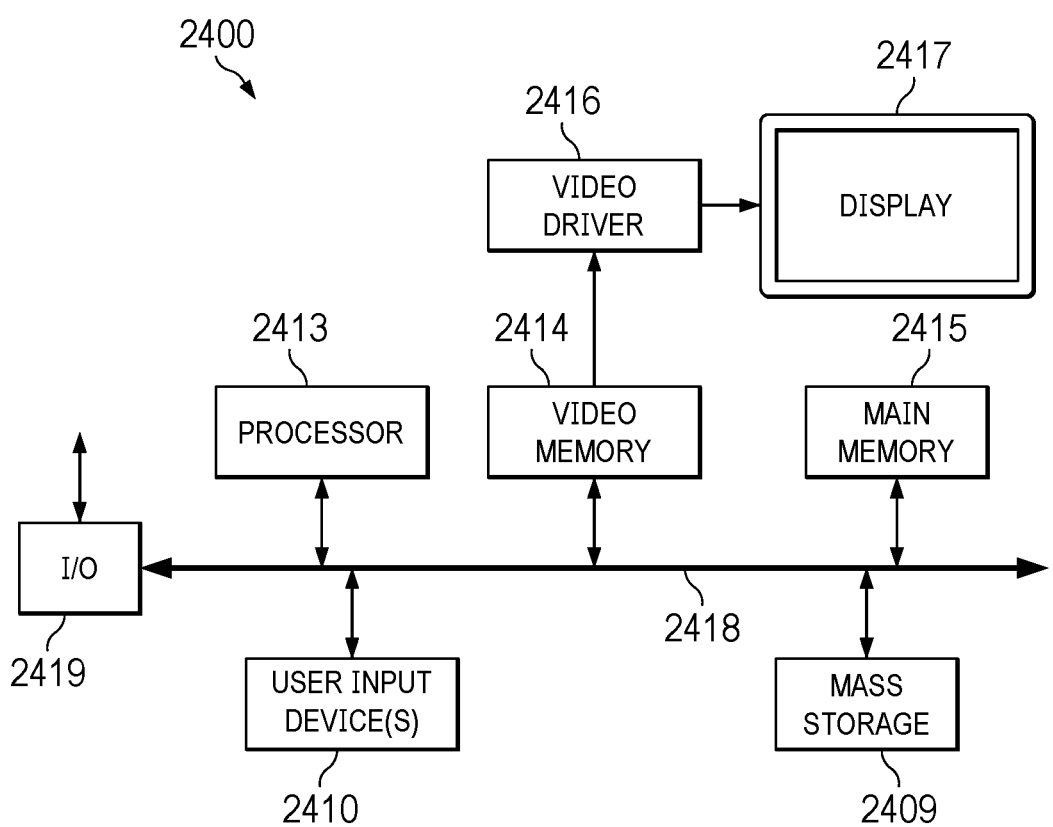
FIG. 24 depicts an exemplary computer system.

Embodiments of the codebase insight generation and commit attribution, analysis, and visualization technology can be implemented on a computer system such as a computer 2400 illustrated in FIG. 24, which is a specialized machine when programmed to implement embodiments of the codebase insight generation and commit attribution, analysis, and visualization technology. The computer 2400 can be a dedicated computer system or a virtual, emulated system located in, for example, a cloud computing environment. Input user device(s) 2410, such as a keyboard and/or mouse, are coupled to a bi-directional system bus 2418. The input user device(s) 2410 are for introducing user input to the computer system and communicating that user input to processor 2413. The computer system of FIG. 24 generally also includes a non-transitory video memory 2414, non-transitory main memory 2415, and non-transitory mass storage 2409, all coupled to bi-directional system bus 2418 along with input user device(s) 2410 and processor 2413. The mass storage 2409 may include both fixed and removable media, such as a hard drive, one or more CDs or DVDs, solid state memory including flash memory, and other available mass storage technology. Bus 2418 may contain, for example, 32, 64, or 128, address lines for addressing video memory 2414 or main memory 2415. The system bus 2418 also includes, for example, an n-bit data bus for transferring DATA between and among the components, such as CPU 2409, main memory 2415, video memory 2414 and mass storage 2409, where "n" is, for example, 32 or 64. Alternatively, multiplex data/address lines may be used instead of separate data and address lines.

I/O device(s) 2419 may provide connections to peripheral devices, such as a printer, and may also provide a direct connection to a remote server computer systems via a telephone link or to the Internet via an ISP. I/O device(s) 2419 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in a non-transient computer readable medium such as a flash memory, optical memory, magnetic memory, compact disks, digital versatile disks, and any other type of memory. The computer program is loaded from a memory, such as mass storage 2409, into main memory 2415 for execution. Computer programs may also be in the form of electronic signals modulated in accordance with the computer program and data communication technology when transferred via a network. Web pages are, in at least one embodiment, created using hypertext markup language or other language compatible with one or more types of web browsers. In at least one embodiment, Java applets or any other technology is used with web pages to allow a user of a web browser to make and submit selections and allow a client computer system to capture the user selection and submit the selection data to a server computer system.

The processor 2413, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 2415 is comprised of dynamic random access memory (DRAM). Video memory 2414 is a dual-ported video random access memory. One port of the video memory 2414 is coupled to video amplifier 2416. The video amplifier 2416 is used to drive the display 2417. Video amplifier 2416 is well known in the art and may be implemented by any suitable means. This circuitry converts pixel DATA stored in video memory 2414 to a raster signal suitable for use by display 2417. Display 2417 is a type of monitor suitable for displaying graphic images.

The computer system described above is for purposes of example only. The codebase insight generation and commit attribution, analysis, and visualization technology may be implemented in any type of computer system or programming or processing environment. It is contemplated that the codebase insight generation and commit attribution, analysis, and visualization technology might be run on a stand-alone computer system, such as the one described above. The codebase insight generation and commit attribution, analysis, and visualization technology might also be run from a server computer systems system that can be accessed by a plurality of client computer systems interconnected over an intranet network. Finally, the codebase insight generation and commit attribution, analysis, and visualization technology may be run from a server computer system that is accessible to clients over the Internet.

Although the present invention has been described in detail, it should be understood that various changes, substitutions and alterations can be made hereto without departing from the spirit and scope of the invention as defined by the claims.

What is claimed is:

1. A method of testing computer software after modification of one or more portions of code of the computer software, the method comprising:
performing by a computer system programmed with code stored in a memory and executable by a processor of the computer system for:
receiving code commits;
representing each code commit in an abstract syntax tree (AST), wherein for each commit, the AST represents a code structure of the commit;
comparing AST's to identify and track developers who made each of the code commits and when changes to the code commits were made;
testing the code commits to identify commits that exhibit predetermined code characteristics;
linking code commits and corresponding misbehaviors by linking the identified code characteristics with the identified developers who made the code commits; and
generating a dashboard that tracks and displays insights associated with the commits, code characteristics, and identified individuals.

2. The method of claim 1, further comprising: determining if the code characteristic of the commit is arson, decay, or clean.

3. The method of claim 2, further comprising:
determining developer performance corresponding to a number of arson, decay, and clean commits for respective developers; and
displaying, by a dashboard tool stored in the memory, relative developer performance for respective developers.

4. The method of claim 1, wherein the insights comprise:
i. when was a negative code characteristic of arson and decay introduced;
ii. when was a positive code characteristic of clean was introduced;
iii. how long did it take for the negative code characteristic to be fixed;
iv. who introduced the negative and positive code characteristics; and
v. a comparison of multiple developers.

* * * * *